March 17, 1970  R. C. FERGASON  3,500,621
COOLING AND CLEANING OF STRIPPER BUSHINGS
Filed Aug. 21, 1967  3 Sheets-Sheet 1

Inventor
Rector C. Fergason
By Kenneth Cluckwell
Attorney

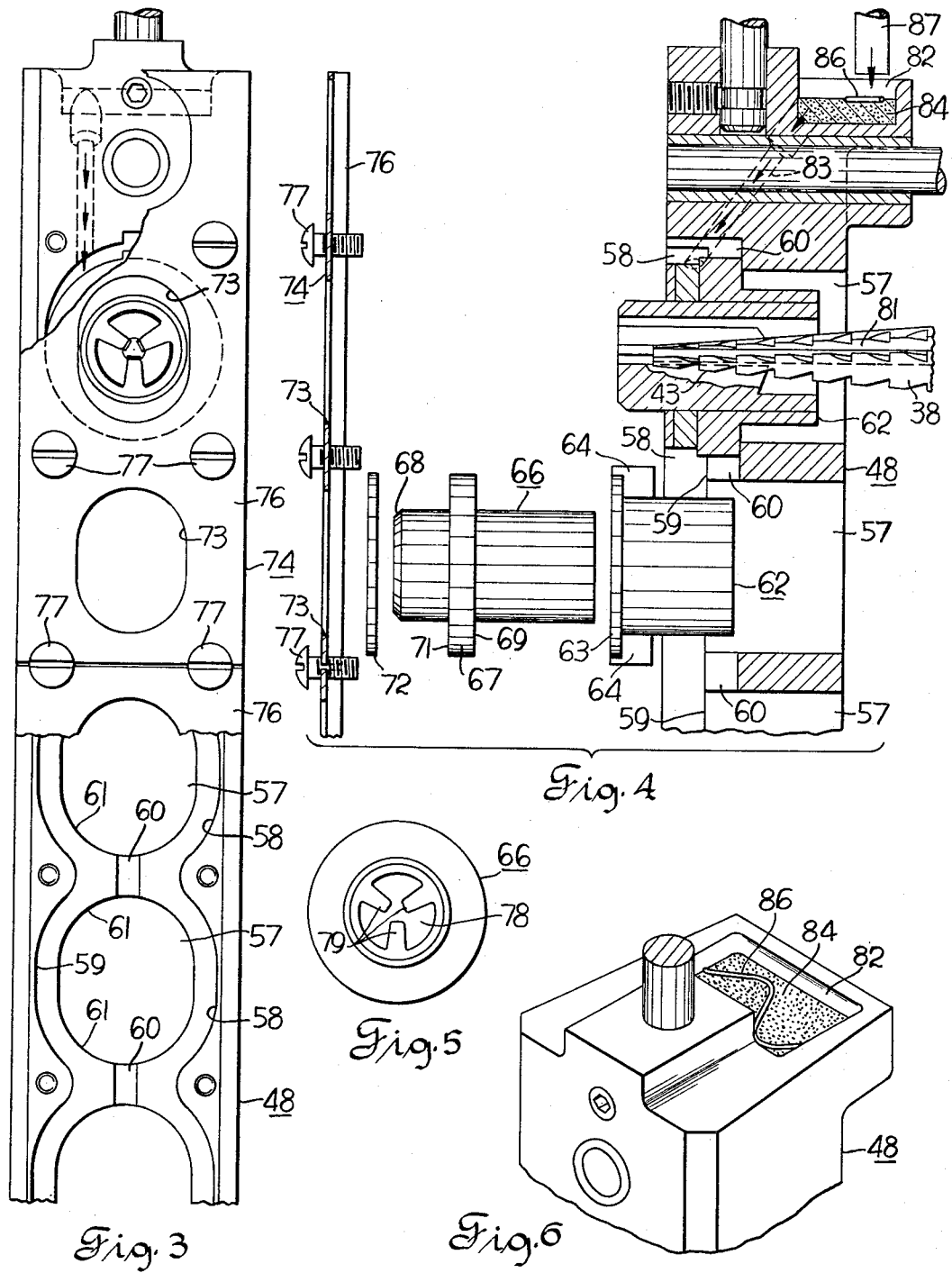

United States Patent Office 3,500,621
Patented Mar. 17, 1970

3,500,621
COOLING AND CLEANING OF STRIPPER BUSHINGS
Rector C. Fergason, Gadsden, Ala., assignor to Allis-Chalmers Manufacturing Company, Milwaukee, Wis.
Filed Aug. 21, 1967, Ser. No. 661,933
Int. Cl. A01d 45/18
U.S. Cl. 56—44          5 Claims

ABSTRACT OF THE DISCLOSURE

A cotton harvester stripper bar structure provided with water lubrication for cooling, cleaning and lubricating stripper bushings and spindles.

---

The present invention relates to drum type cotton harvesters and more particularly to an improved stripper bar structure with water lubricating, cooling and cleaning means.

A drum type cotton harvester includes a plurality of continuously rotating spindles supported by and projecting from a rotary drum or cylinder. The drum is rotated on a vertical axis and moved along a row of cotton plants while the rotating picking spindles are successively projected into the plants to pick up cotton fibers therefrom. The cotton collected on the spindles during each rotation of the drum is stripped therefrom by rotating bushings located on the spindle and retained in a stripper bar.

Each spindle is provided with slots extending parallel to the spindle's longitudinal axis. These slots receive ribs complementary thereto formed internally in the stripper bushing thereby providing a driving connection between spindle and brushing so that they rotate in unison while the bushing is free to slide axially of the spindle.

The spindles and associated stripper bushings are driven at a relatively high rate of speed, 2500 to 3000 r.p.m., with the drum normally driven at ground speed. While rotating at this speed and moving with the drum, the stripper bushings are also moved in and out on the spindles by the stripper bar which is eccentrically controlled by frame mounted cam tracks. As the stripper bar and associated stripper bushings move outwardly along the spindles, cotton previously picked and wrapped around the spindles will be pushed or stripped from the ends of the spindles at a certain point in the rotation of the drum where the stripped cotton is picked up and conveyed to a storage compartment on the machine.

As previously stated, the spindle stripper bushings operate at a relatively high speed and while the radial loads are light due to the floating stripper bushing mounting, the thrust loads are much greater requiring adequate lubrication for efficient operation and to increase the wear life of the component parts. Even with adequate lubrication, a considerable amount of heat is generated which would be damaging to convetional bearing materials unless means is provided for carrying heat away from the bearings. In addition, stripping of cotton from the spindles develops a gum deposit or residue on the stripper bushing and related parts causing poor operation and resistance to reciprocatory motion of the bushing on the spindle which can increase the power consumption and cause damage resulting in costly down time and repairs. A solvent is needed that will dissolve the gum deposit and automatically keep the stripper bushing clean and in good working condition.

In the present structure the universal coolant and solvent, water, is continuously distributed to the upper end of the stripper bars at one location in the drum rotation, preferably where the stripper bars are close together as they are just before the spindles enter the picking zone. The water is received by a small reservoir formed in the upper end of each stripper bar and is conveyed through a passage in the bar to the upper stripper bushing and from there by gravity to each succeeding bushing down the entire length of the stripper bar to be ultimately deposited on the ground. The water lubricates and cools the bearing surfaces of the stripper bushings and also dissolves and carries away any gum or dirt deposits.

It is an object of this invention to provide and improved cotton harvester wherein water is used to cool, lubricate and clean the picker and stripper mechanism.

It is a further object of this invention to provide inexpensive means for cooling, lubricating and cleaning the picker and stripper mechanism in a cotton harvester.

It is a further object of the invention to provide a cotton picking mechanism which is efficient and requires a minimum of servicing.

These and other objects of invention will become apparent as the description herein progresses and points out other advantages thereof.

With the objects named in view and others hereinafter pointed out, the invention consists in certain novel and useful combinations of parts as hereinafter described and claimed, and in order that it may be fully understood, reference is to be had to the accompanying drawings in which:

FIG. 3 is a front view of a portion of a stripper bar with a cover plate mounted on the upper half and showing the path for the coolant and lubricant;

FIG. 4 is a cross sectional view of a stripper bar and associated parts, portions of which are in an exploded condition;

FIG. 5 is a front view of a stripper bushing and thrust collar;

FIG. 6 is an isometric view of the upper portion of a stripper bar showing the coolant and lubricant receiving well.

Figure 1:
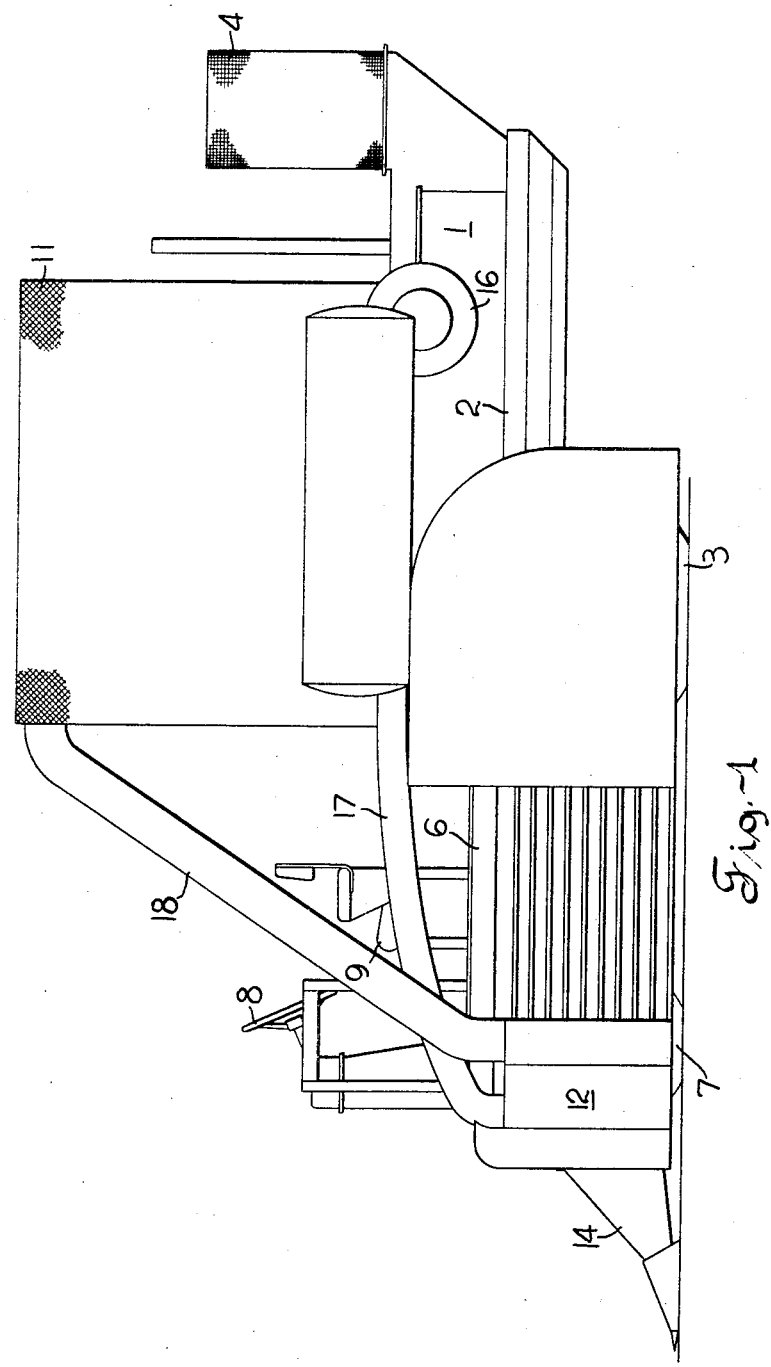
FIG. 1 is a side elevation view of a drum type cotton harvester.
Figure 2:
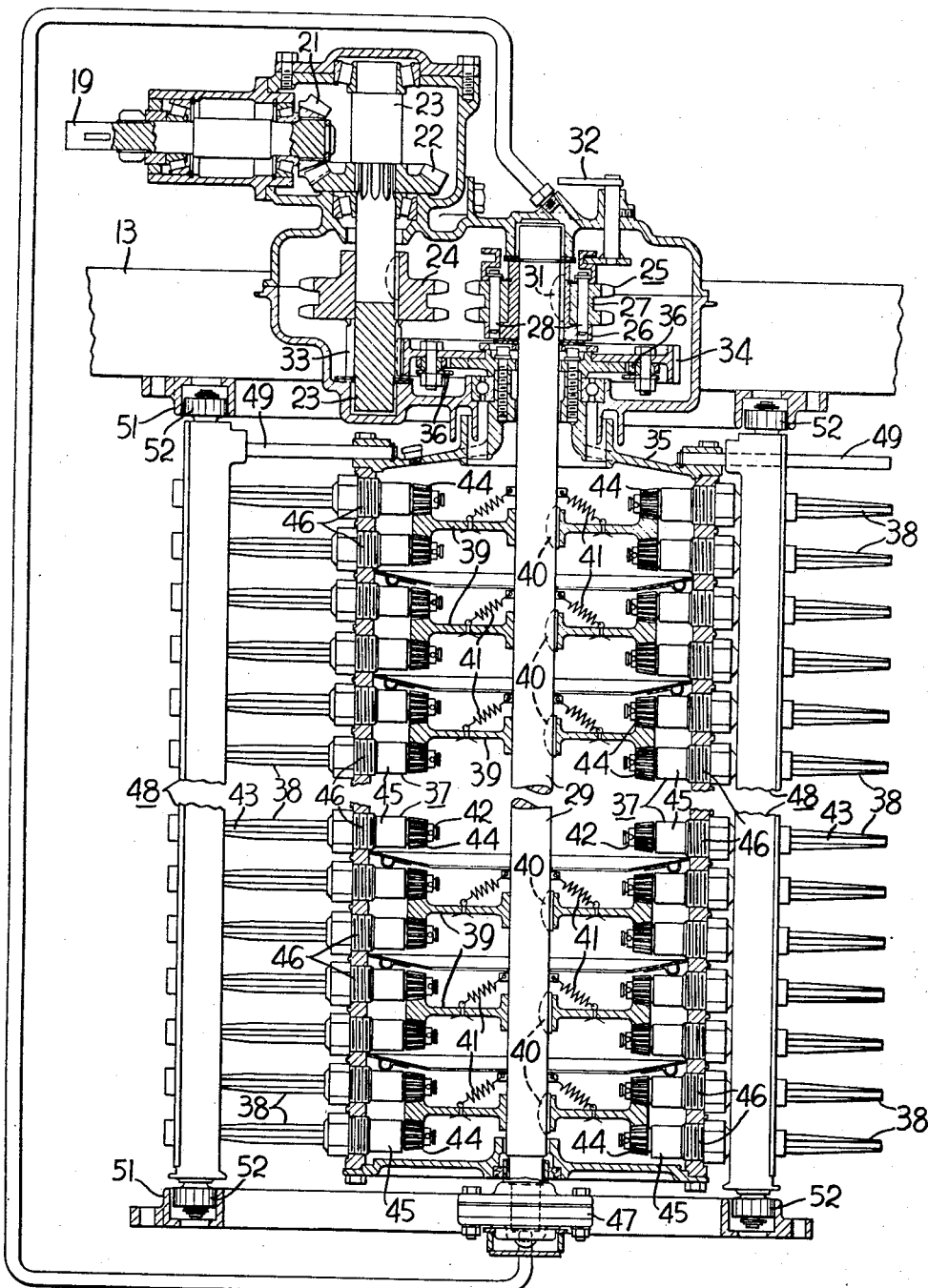
FIG. 2 is a cross sectional view of a portion of a drum type cotton harvester embodying the invention, showing the stripper bars, cam tracks, power train and picking spindles.

Referring to FIG. 1, the cotton harvester embodying the invention consists generally of an engine 1 joined to an axle beam (not shown) and supported thereby as a cantilever beam. A frame member 2 supports engine 1 from the axle housing. A pair of laterally spaced traction wheels 3 (only one is shown) are operatively connected to opposite ends of the axle housing in a conventional manner. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 2 and 6 rearwardly of operator's seat 9. Cotton picker assemblies 12 are mounted on each side of the forward end of frame 6. These assemblies 12 are carried by a subframe 13 (FIG. 2) which is adjustably connected to frame 6 for vertical movement relative thereto. The forward end of assemblies 12 (FIG. 1) are provided with plant dividers 14 which guide cotton plants into contact with cotton pickers which are positioned just rearwardly of the plant dividers. If further details of the plant dividers are desired, reference may be had to U.S. patent application Ser. No. 456,399, now Patent 3,380,233 filed May 17, 1965, for Plant Divider for Harvesters. Frame 2 supports a blower 16 which is provided with a duct 17 which delivers pressurized air to picking assembly 12 and to a picked cotton delivering duct 18 for depositing picked cotton into basket 11.

Engine 1 is provided with a power takeoff shaft (not shown) which is operatively connected to shaft 19 (see FIG. 2) of picking unit 12. A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown). Double sprocket 25 includes a center portion 26 upon which the outer portion 27 is journaled. These two portions 26 and 27 are selectively joined together by means of pins 28. Center portion 26 is keyed to shaft 29 for rotation therewith by conventional means such as half-moon key 31. Pins 28 can be raised vertically by means of handle 32 and the mechanism connected therewith to interrupt the driving connection between portions 26 and 27.

Beneath sprocket 24, a gear 33 is formed in shaft 23. Gear 33 is drivingly engaged with a gear 34 which surrounds shaft 29 and which rotates relative thereto. Gear 34 is attached to drum 35 for rotating same. A ratchet mechanism 36 is interposed between drum 35 and gear 34 so that drum 35 can only be driven in one direction. If driven in the opposite direction, the ratchet mechanism interrupts the drive.

Reference numeral 35 designates the drum or cylinder of a cotton picking machine and which drum carries a plurality of cotton picking assemblies 37. Each picking assembly includes a picking spindle 38. Pairs of horizontal rows of spindles 38 are driven by a double bevel gear 39 secured to drive shaft 29 by means of key 40. Springs 41 suspend gears 39 from shaft 29 and half-moon keys 40 permit gears 39 to be self-aligning. By not having the weight of these gears 39 supported on the lower of the pair of spindles being driven by such gear, backlash problems in the gears are eliminated.

The spindle assembly 37 includes a picking spindle 38 having an inner shank portion 42 and a picker portion 43. A beveled pinion gear 44 is attached to the inner end of spindle 38 and drives same by means of bevel gear 39. Tubular support 45 is positioned about the after portion of spindle 38. The outer surface of tubular support 45 is threaded as at 46 so that spindle assemblies 37 can be securely received by corresponding threaded openings in the drum 35.

Oil for lubrication of the gears and bearings is furnished by pump 47 which pumps oil to the upper portion of the picker unit and thereafter permitting same to return to the pump by action of gravity while performing its lubricating function. The impeller of pump 47 is operatively connected to the lower end of shaft 29 for rotation therewith.

A stripper bar 48 is associated with each vertical row of spindles on the drum 35 and is supported from the drum by means of radial extending rods 49 upon which slats 48 are slidably mounted. A pair of vertically spaced stationary cam tracks 51 carried by means of frame 13 at the upper end and by means (not shown) at the lower end are arranged to receive cam follower rollers 52 carried by the stripper bars 48 and to cause movement of the stripper bars longitudinally of the spindles during rotation of the drum.

Each of the spindles 38 projects through an opening 57 in the stripper bar (see FIGS. 3 and 4) with the outer portion 58 of the opening being larger in diameter than opening 57 and thereby forming a vertical shoulder 59. A vertical row of slots 60 connects openings 57.

Openings 57 are vertically elongated (see FIG. 3) and are provided with circular end walls 61. A plastic tubular guide or bearing member 62 (FIG. 4) is received in stripper bar opening 57. This guide is formed with an integral outer end flange 63 and a pair of radially extending diametrically oppositely positioned lugs 64. The inner face of the flange 63 contacts the shoulder 59 with the lugs 64 being received in the slots 60. The lugs 64 prevent rotation of guide 62 but permit limited vertical movement thereof relative to the stripper opening 57.

A stripper bushing 66 with a breakaway collar 67 positioned in spaced relation to its outer end 68 is rotatably received by the tubular guide 62. The thrust collar inner surface 69 bears against the guide flange 63 while the collar outer surface 71 rotatably contacts a plastic washer 72. The outer ends 68 of stripper bushings 66 extend through vertically elongated openings 73 in cover plate 74. Cover plate 74 is made up of a series of relatively short end abutting sections 76 which are rigidly secured to the stripper bar 48 by means of cap screws 77. The stripper bushing 66 (FIG. 5) is provided with a central opening 78 having three equally spaced inwardly projecting tapered ribs 79 which are snugly received by the corresponding grooves 81 (FIG. 4) in the outer picking portion 43 of the spindles 38.

From an inspection of FIG. 3 it can be seen that openings 58 are so elongated that adjoining openings 58 merge therewith to form a continuous vertical passage extending from one end of the stripper bar to the other. An additional passage from one end of the stripper bar to the other end is formed by openings 57 joined together by slots 60. At the upper end of each stripper bar 48 a recess 82 (FIGS. 4 and 6) is provided. An angled passage 83 connects this recess with upper stripper bushing opening 58. A sponge or the like 84 is held in the recess 82 by means of a wire clip 86. The sponge protects the relatively small passage 83 against the possibility of becoming plugged by dirt or plant debris. A pump (not shown) carried by the harvester continuously supplies water from a suitable reservoir or tank carried on the cotton harvester by means of a tube 87. This supply tube has its discharge end located immediately above and in vertical alignment with the stripper bar recesses 82 as they rotate past the tube. The discharge end of tube 87 is positioned to be above pocket 82 when the bars are in a position similar to the bars shown on the right in FIG. 2. In this position the bars are closely adjacent to each other and water discharged continuously from tube 87 will go into pockets 82 rather than into the space between the slats as it would when the slats are spaced apart.

The stripper bars 48 rotating under tube 87 are supplied with water on each rotation of drum 35 with said water running down to upper stripper bushing 66 and then running downward by gravity from one stripper bushing to the other down the entire length of the stripper bar finally to be discharged on the ground along with any gums, dirt or the like such as the water may have washed off the stripper bushings. In addition, it is seen that the water will also cool these stripper bushings and will also lubricate same. Stripper bushing 66, bearing 62 and washer 72 are of such materials that water is an adequate lubricant. Should any of the water descending escape and find its way onto the picking spindle, no harm is done as the picking spindle is customarily moistened with water before picking and some water on the harvested cotton does not bring a reduction in grade that would be suffered had the escaping lubricant been oil to discolor and damage the cotton.

While in the foregoing, a preferred embodiment of the invention has been shown and described, it should be understood that it is not intended to limit the invention to the illustrated details of construction but that the invention includes such other forms and modifications as are embraced in the scope of the appended claims.

The embodiments of the invention in which an exclusive property or privilege is claimed are defined as follows:

1. In a cotton harvester having a frame, a picking cylinder carried on said frame, means for rotating the cylinder on said frame about a vertical axis, a plurality of picking spindles radiating horizontally from said cylinder, each of said spindles being journaled in said cylinder, means for rotating said spindles about their longitudinal axes, each of said spindles being provided with a picking portion extending from said cylinder, a cotton stripper bushing positioned about each spindle, means providing driving connection between said stripper and said spindle while permitting relative radial movement, a thrust collar positioned about said stripper bushing, a plurality of vertically extending bars carried by said cylinder and adapted to be moved radially during rotation of said cylinder, a vertical row of said stripper bushings being positioned in each of said bars with said stripper bushings being moved radially by contact between said thrust collar and said bar, each of said bars being provided with a generally vertically extending passageway extending from the upper end of each of said bars to the lower end thereof for the passage of a coolant and lubricant for said stripper bushings, and each of said bars being provided with a reservoir for holding a supply of coolant and lubricant which is replenished during each revolution of said cylinder and which reservoir is directly connected to the upper end of said passage.

2. The combination recited in claim 1 and wherein said bearing members are constructed of plastic and said coolant and lubricant is water.

3. The combination recited in claim 2 and wherein a cover member is provided for retaining said bearing members in said bars, each of said bearing members is provided with one end portion which abuts one side of said thrust collar and a plastic washer is positioned between the other side of said thrust collar and said cover member, said cover member having an opening therein of greater size than said stripper bushing but of less size than said washer so that said stripper bushing may move vertically in said opening without said washer permitting material to move through said opening.

4. The combination recited in claim 1 and wherein said bar being provided with a vertical series of horizontally extending apertures therethrough for receiving said bearings, and passageways between said apertures for permitting the flow of coolant and lubricant from one aperture to another aperture by gravity.

5. The combination recited in claim 1 and wherein said passageways are so positioned to deliver the coolant and lubricant to said bearing, stripper bushing and washer at a point closely adjacent said thrust collar.

References Cited

UNITED STATES PATENTS

| | | | |
|---|---|---|---|
| 1,742,493 | 1/1930 | Berry | 56—44 |
| 1,786,851 | 12/1930 | Johnston et al. | 56—47 |
| 1,909,646 | 5/1933 | Wirth | 56—41 |
| 2,302,180 | 11/1942 | Brown et al. | 56—44 |
| 2,876,611 | 3/1959 | Hubbard | 56—41 |

RUSSELL R. KINSEY, Primary Examiner